Figure 9:
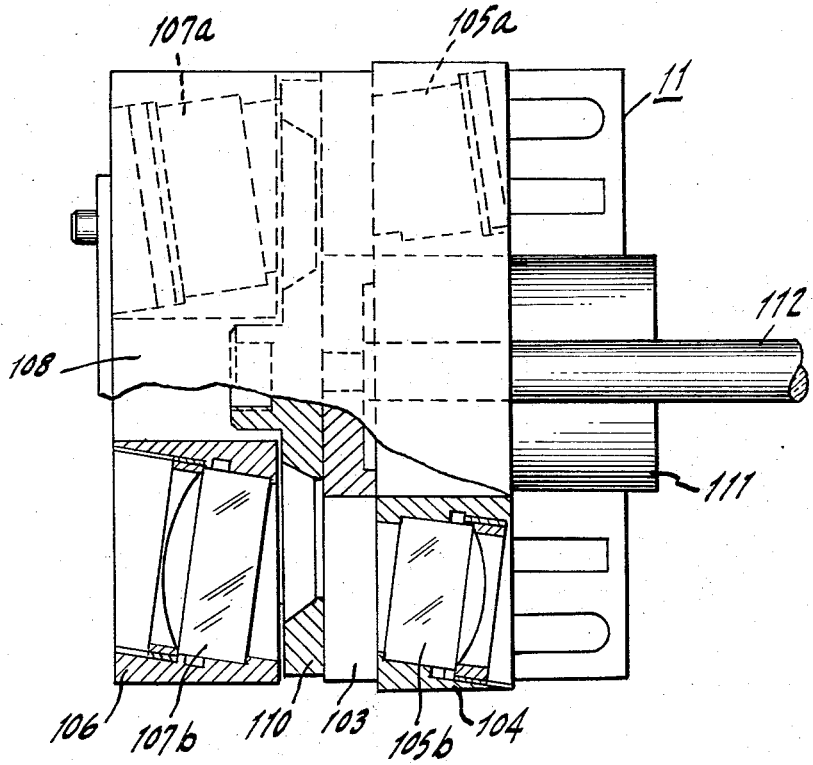

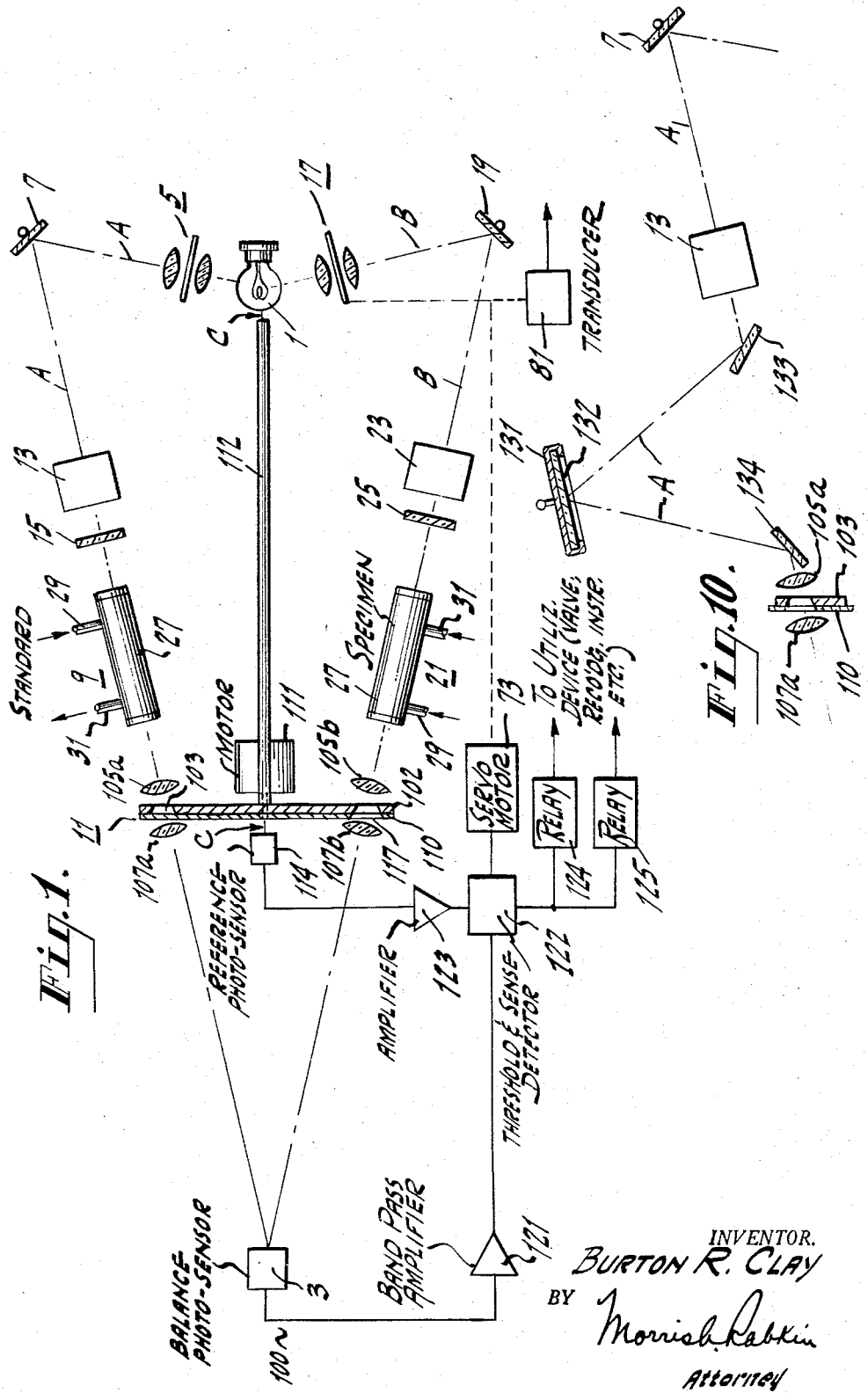

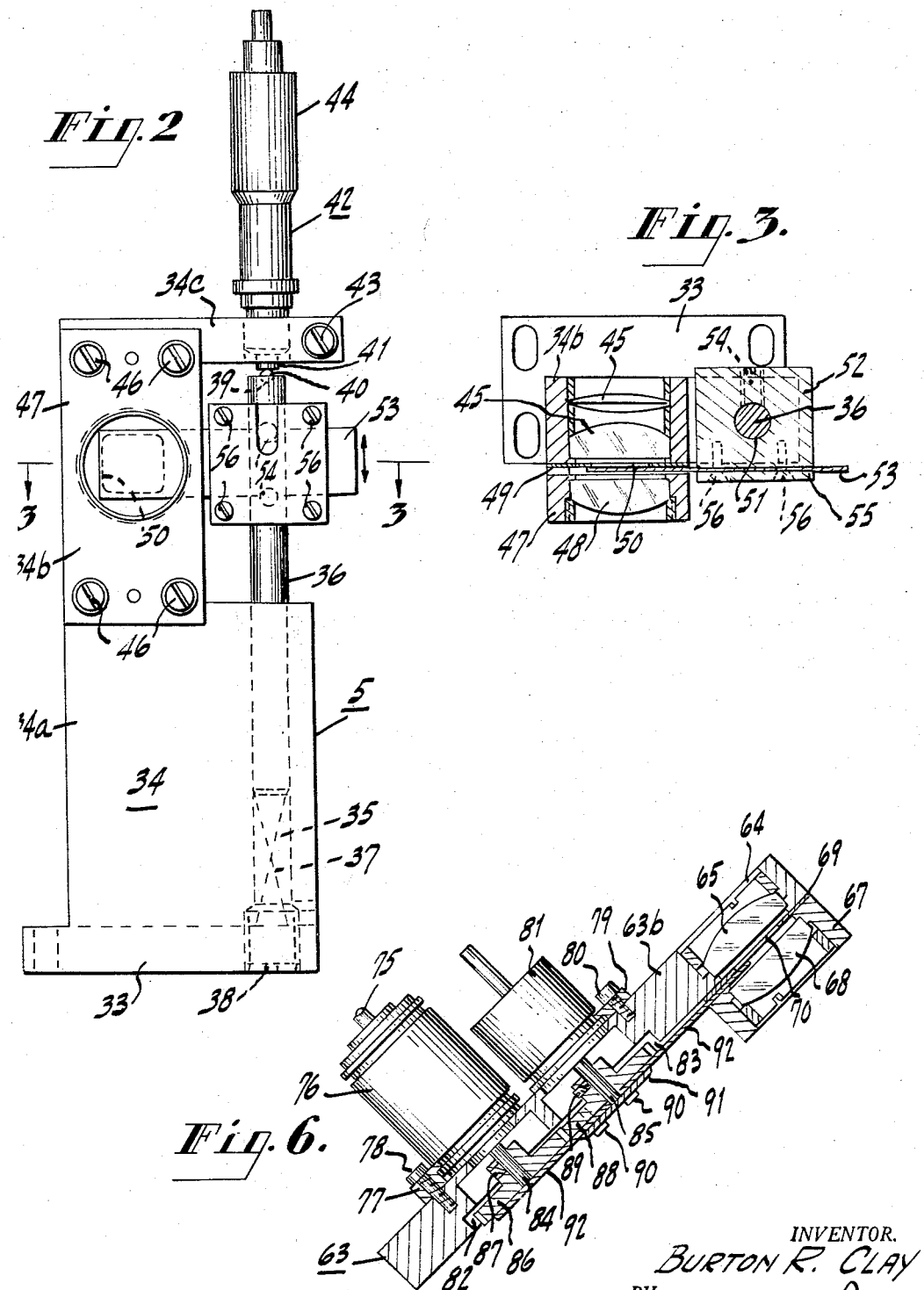

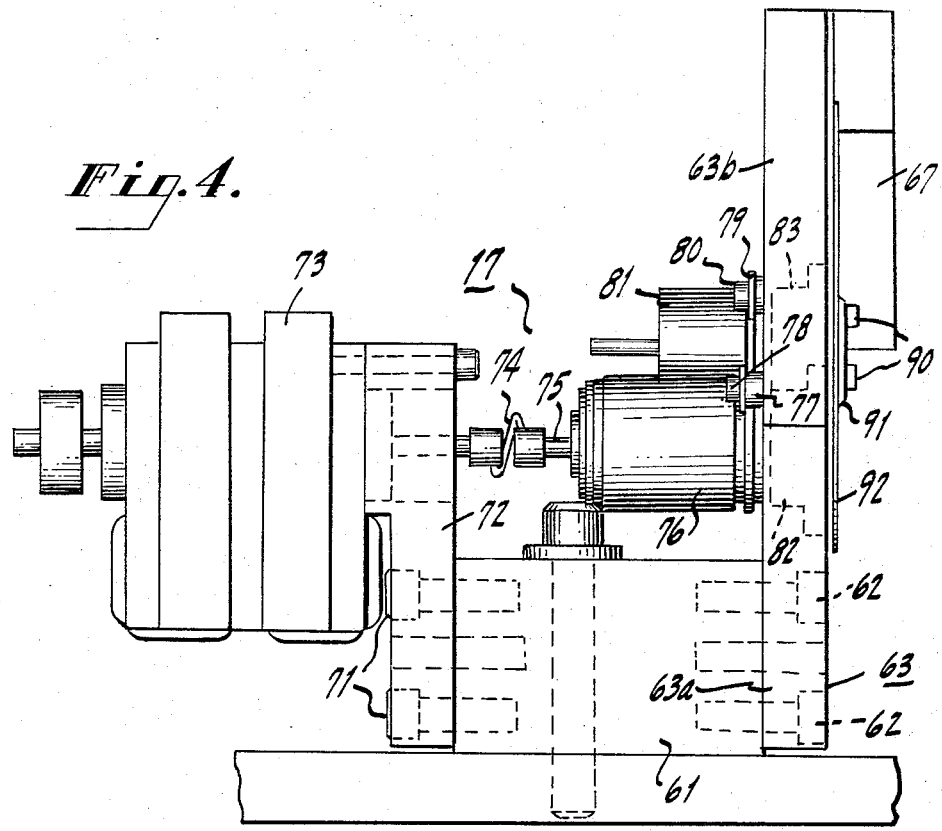
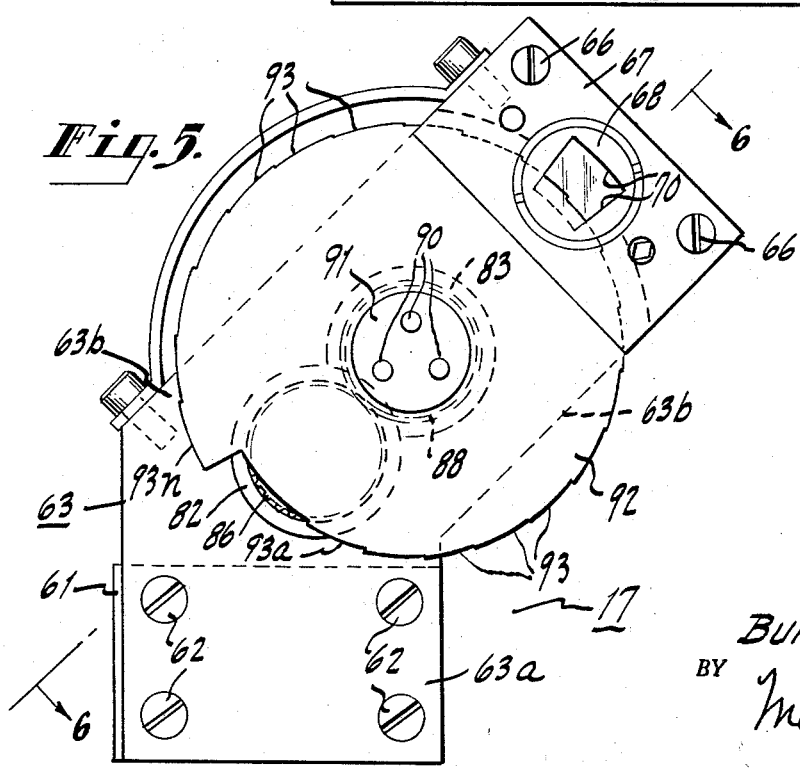

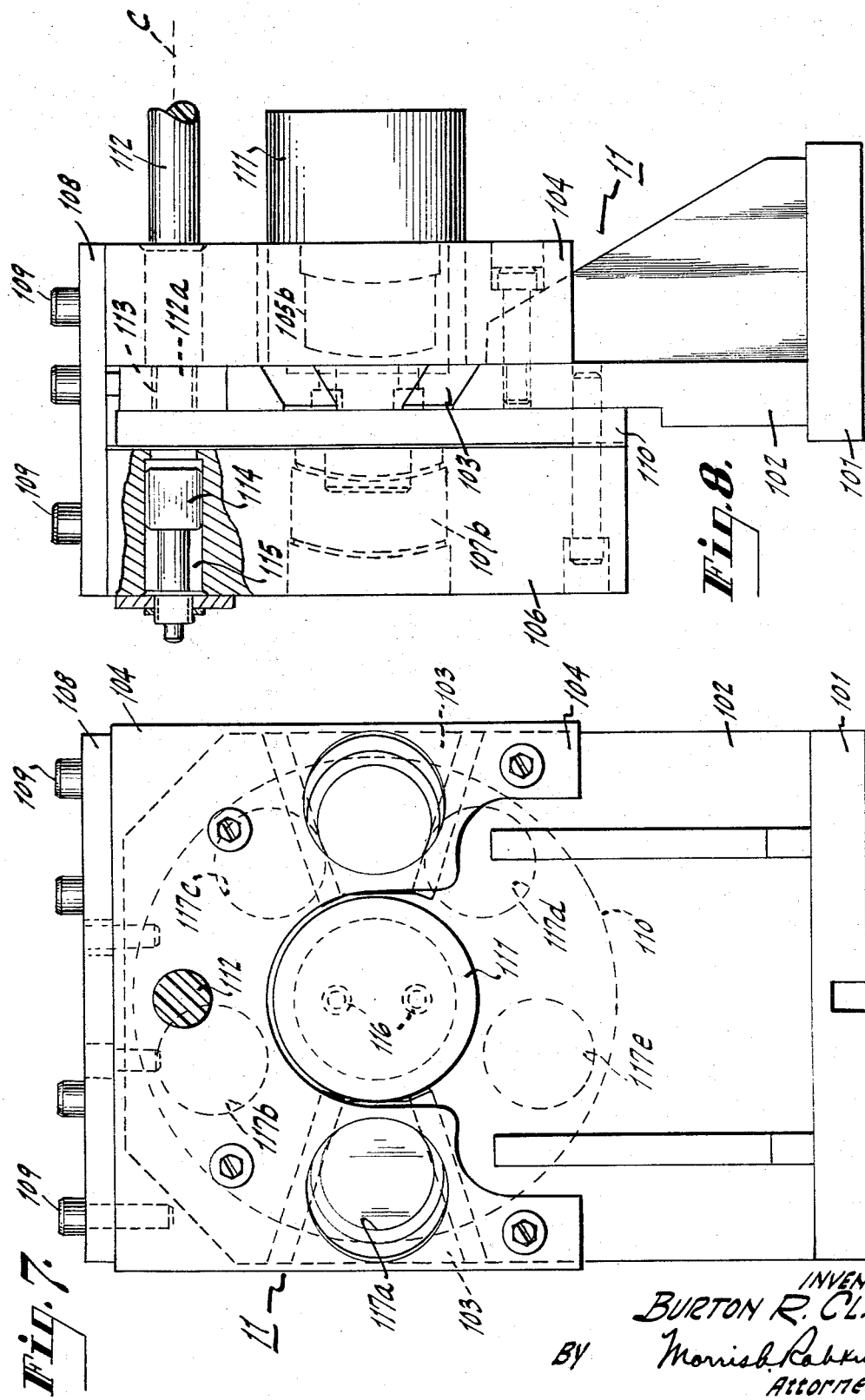

Dec. 20, 1966    B. R. CLAY    3,292,484
APPARATUS FOR MONITORING SPECTRAL
CHARACTERISTICS OF SUBSTANCES
Filed Dec. 21, 1961    6 Sheets-Sheet 6

INVENTOR.
BURTON R. CLAY
BY Morris B. Rabkin
Attorney

3,292,484
APPARATUS FOR MONITORING SPECTRAL CHARACTERISTICS OF SUBSTANCES
Burton R. Clay, Wayland, Mass., assignor to Radio Corporation of America, a corporation of Delaware
Filed Dec. 21, 1961, Ser. No. 161,031
1 Claim. (Cl. 88—14)

This invention relates to apparatus for and a method of evaluating and monitoring the spectral characteristics of substances, and more particularly to a colorimeter device for measuring accurately and continuously such spectral characteristics of a substance as transmission, reflection, luminosity, and the like.

There are many industrial and other processes in which it is important to determine spectral characteristics of products being manufactured or otherwise handled in order to meet certain standards of quality, for example. In some instances, samples of such products are removed periodically for spectral examination, and, depending on the findings, the manufacturing equipment may have to be shut down for such correction as may be found necessary. This, of course, is time consuming and costly. Moreover, one cannot always be certain that the necessary correction has actually been attained without, at least to some degree, resorting to trial and errors, thus further adding to cost and causing delay.

To minimize cost and delay, there have been proposed on-line colorimeters which avoid the need for periodic sampling. Colorimeters of this type are intended to examine the products in course of production, compare the characteristics of the products with known or readily determinable reference characteristics, and either indicate what correction, if any, may be necessary, or effect such correction through suitable instrumentalities. Certain on-line colorimeters known heretofore have employed two separate light sources, one for illuminating the product being manufactured and the other for illuminating a standard product to provide a reference standard; and along with these sources are employed two respectively associated photo sensors. In colorimeters of this type, it is not infrequent that the light sources and/or the sensors drift with respect to each other due to different aging characteristics, thereby introducing errors which often also prove to be costly. There have also been proposed other on-line colorimeter systems which have asymmetrical optical paths of different numbers of optical elements and surfaces. In such latter systems, the optical devices often acquire different transmission values with time, or due to precipitation, or to abrasion upon being cleaned.

The primary object of the present invention is to provide improved apparatus for evaluating and, if necessary, monitoring the spectral characteristics of substances, which system will be free from the aforementioned and other similar disadvantages of previously known spectral monitoring systems.

More particularly, it is an object of the present invention to provide an improved colorimeter system which readily lends itself to use on a production line wherein it is desirable to ascertain the spectral characteristics of the product or substance being produced, and which will not only determine accurately the spectral characteristics of the product or substance, but which may also automatically operate to institute corrective steps immediately upon detection of an intolerable departure of the substance from acceptable standards.

Another object of the invention is to provide an improved on-line colorimeter system the significant operating components of which are free from harmful drift due to age or any other cause and the transmission characteristics of which will remain constant over a long period of time.

Still another object of the invention is to provide an improved colorimeter which will measure the spectral characteristics of a substance accurately and continuously and which, while not limited thereto, is especially adaptable for on-line use in product manufacturing equipment as an on-line monitoring instrument.

A further object of the invention is to provide an improved colorimeter system which can be adapted readily to a large variety of equipments for on-line use.

Still a further object of the invention is to provide an improved colorimeter system as above set forth which is capable of providing either an analogue or a digital output for such use as may be required.

Another object of the invention is to provide, in a colorimeter system as aforesaid, improved light attenuator mechanisms by means of which the intensity of the examining light beams of the system can be controlled accurately over small increments.

Still another object of the invention is to provide a novel light modulating mechanism which is especially useful in colorimeter systems as above set forth, although by no means limited to such use.

It is also an object of the invention to provide an improved colorimeter system as aforesaid which is quite simple in construction, and which is highly efficient in use.

Briefly, a colorimeter system according to the present invention makes use of a pair of light beams the intensity of one of which is set by a standard material, and the intensity of the other of which is set by a specimen of a material under examination. These intensity set beams are concurrently modulated sinusoidally in 180° phase displaced relation. The modulated beams are received in additive relation by a photo sensor which balances or compares them one against the other and provides an output signal which is indicative of the difference, if any, between the two, set, light beam intensities. Suitable detecting means responsive to this signal senses the amplitude and sense thereof and provides a second output signal which can be applied to appropriate utilization means for recording the information thus derived, for monitoring the material under examination, or the like.

In one form of the invention, the colorimeter comprises an optical system which is symmetrical with respect to a common axis and wherein light from a single source is projected along each of the two symmetrical light paths. In one of these paths, there is located the material under examination, and in the other path, there is located a standard material with reference to which a comparison is to be made. These materials modify the intensity of the two light beams in accordance with their respective spectral characteristics. This system also includes a single detector in the form of a photo sensor which receives light from each of the light paths after the light has traversed both the standard material and the material under examination. The sensor adds the two light beams received by it from the two paths to provide a balance signal output, that is, a signal representative of whether the two, set light intensities are identical, and therefore balance each other, or not.

The two light beams are time-identified by alternately illuminating the photo sensor or detector with alternately oppositely varying quantities of the modified light from the two paths. This is accomplished by a mechanical chopper which sinusoidally modulates each light beam and which always presents to the detector light of a constant intensity if the two beams are of equal intensity. However, if the two modulated beams are of unequal intensity, the sensor, receiving the total illumination from both paths, provides a sinusoidal output signal indicative of the difference in the light intensities of the two beams and the sense of such difference.

To provide the desired chopping action or light modulation, the apertures in the chopper are so shaped and arranged that, as rotation of a chopper disk in the mechanism takes place, the aperture in one light path is made to close at precisely the same instant and at the same rate as that at which the other one is made to open; and, when one reaches maximum, or full, opening, the other reaches zero. Measurement is thus made essentially by optically null-detecting the light intensity from the two paths through a comparison of the light intensities of the two modulated beams to thereby obtain an electrical signal indicative of whether equality or inequality exists between the intensities of the two light beams as they reach the chopper. The comparison of intensities may be made either as a simultaneous integration of intensities from many wave lengths from a broad band source, or it may be made wave length by wave length. In the first case, an unfiltered hot-body source, such as an incandescent lamp, may be used; and in the second case, a special narrow-band emitter may be used. In the latter case, the emitter may be either (1) an incandescent source in combination with band limiting filters or with monochromating elements, or (2) a plasma-emission or other monochromatic source, whichever suits the specific purpose of the measurement to be made.

Where there is any unbalance, the sensing of the direction of unbalance is achieved by making use of either the aforementioned chopper disk apertures or of additional openings in the chopper mechanism in combination with a second light sensor to produce clock pulses or a phase reference signal. The balance signal and the phase reference signal are combined to select an appropriate one or the other of two relays for closure. If the sample density, for example, is greater than that of the standard, one of the relays is closed; if the sample density is lower than that of the standard, the second relay is closed; and if the densities of the sample and the standard match each other within a prescribed range (say, for example, within a single bit in a bit coded system), then neither of the two relays is closed.

The quantity of light in either of the two paths is set by precision aperture area control of appropriate apertures in the optical system, rather than by density wedges or attenuating filters which could become more or less dirty or age in the course of time in such a way as to change calibration. With the addition of a digital optical attenuator in one of the paths, the basic device or system may be arranged to provide an output which relates the specimen density to the standard density in digital terms. This attenuator changes the intensity from the specimen to match that from the standard. If desired, the basic system or device may be provided with an analog attenuator, which is servo-driven, and an appropriate transducer to provide an analog output.

The invention itself, both as to its organization and method of operation, as well as additional objects and advantages thereof, will be more readily understood from the following description, when read in connection with the accompanying drawings in which FIGURE 1 is a diagrammatic view of one form of colorimeter evaluating and/or monitoring system according to the present invention, this form being useful in determining the spectral transmission characteristic of a specimen or sample under examination, FIGURE 2 is a side elevation of one form of a manual attenuator which may be used in that one of the optical paths of the system of FIGURE 1 in which the standard or reference material is included, FIGURE 3 is a detailed, sectional view taken along the line 3—3 of FIGURE 2, FIGURE 4 is a side elevation of one form of servo-driven attenuator suitable for use in the optical path of the system of FIGURE 1 in which the sample of material being examined is included, FIGURE 5 is a side elevation of the attenuator of FIGURE 4 as seen from the right of FIGURE 4, FIGURE 6 is a sectional view taken along the line 6—6 of FIGURE 5, FIGURE 7 is a front elevation of one form of chopper mechanism or light modulator which may be used in the system of FIGURE 1 in accordance with the present invention, FIGURE 8 is a side view of the chopper mechanism as seen from the left of FIGURE 7, FIGURE 9 is a top plan view, partly in section, of the chopper mechanism of FIGURE 7, FIGURE 10 is a fragmentary, diagrammatic view of a modified form of colorimeter system according to the present invention, this system being useful in determining the spectral reflection characteristics of a specimen or sample under examination, FIGURES 11A, 11B, 11C and 11D are diagrammatic views illustrating the operation of the chopper mechanism of FIGURES 7, 8 and 9, and FIGURES 12A, 12B and 12C are sets of curves illustrating the operation of the balance light sensor of FIGURE 1.

Referring more particularly, first, to FIGURE 1, there is shown a colorimeter system comprising an optical system having, at one end, a light source 1 which furnishes a pair of scanning beams A and B and a phase reference beam C, these beams preferably having their respective axes on the center of illumination of the source 1. At the other end of the system is an opto-electrical light detector 3 which is common to the light paths of the beams A and B and receives from both of these paths, concurrently, light modulated as hereinafter described. The light detector 3 acts as a balance photo sensor for such light. The optical units or components which provide paths for the respective scanning beams A and B are arranged symmetrically with respect to a line joining the light source 1 and the sensor 3.

In the path of the scanning beam A, these optical units comprise, following the source 1 and in the order named, a manually adjustable attenuator 5 for controlling the initial intensity of the beam A, a universally mounted mirror 7 for bending the beam A and directing it to the sensor 3, a container or standard cell 9 for holding a standard material through which the beam A is transmitted and which modifies this beam to provide a reference beam of standard intensity against which the intensity of the beam B, as modified by a specimen or sample under examination, is to be compared, and a light modulator 11 for modulating the intensity modified beam A in the manner described below. In some cases, it may also be useful to include between the mirror 7 and the container 9 a suitable integrator cell or light diffuser 13 and an optical filter system 15 for band limiting the beam A. One form of optical filter system which is suitable for this purpose is described below in greater detail.

In the path of the scanning beam B, the optical units comprise, in the same order as in the case of the scanning beam A, an attenuator 17 which is adjustable by an electric motor (hereinafter more particularly identified) for controlling the initial intensity of the beam B, a universally adjustable mirror 19 which bends the beam B and directs it to the sensor 3, a container 21 for holding a specimen or sample of material to be examined, evaluated and, if desired, also monitored, and the same modulator 11 for also modulating the beam B after it has been transmitted by the specimen in the container 21, the specimen imparting to the beam B an intensity according to its transmission characteristic. Again, if desired, an integrator cell or light diffuser 23 and an optical filter system 25 may be included between the mirror 19 and the container 21.

The containers 19 and 21 may be of any suitable form, such as tubular vessels 27 each having an inlet 29 and an outlet 31 through which the respective standard and specimen materials in the form of fluids (liquid or gas) are admitted into and withdrawn from the respective vessels, each vessel being closed by a fluid tight, transparent window at each end so that the beams A and B can be readily transmitted through the vessels and their contents. The standard material is preferably, but not necessarily, circulated from a suitable reservoir (not shown) through the reference, or standard cell, container 9 and back to the reservoir; or it may be transferred to a waste container, if desired. The specimen material may be circulated similarly through the container 21. This allows common fluid variables to cancel out.

The filter systems 15 and 25 may, for example, comprise a plurality of individual, narrow band, optical filter elements, each of a different band pass, and collectively such that they will cover either the whole visible spectrum (and even beyond that spectrum, if desired) or only a part of such spectrum. Thus, the range covered by the filter systems may be divided into discrete sections or bands, each covered by an appropriate one of the individual filter elements. The individual filter elements may be mounted in circumferentially spaced openings along the margin or edge of a rotary disk so that, as the disk is rotated, successive balances may be obtained at successive wave lengths. This enables the colorimeter to produce a spectro-photometric curve for a given substance or material under examination.

As will be noted, the light source 1, the sensor 3 and the modulator 11 are common to both of the beams A and B in the symmetrically system described above. Thus, any changes in either the light source 1 or the sensor 3 due to aging, drift or the like will not introduce any errors in the system, since precisely the same change, if any, will appear in each arm of the system concurrently. Also, by appropriately enclosing the shortly to be identified optical elements of each of the optical components, changes therein due to dirt, precipitation, abrasion upon cleaning and the like are minimized. The described system is, therefore, notably free from sources of error.

The manually adjustable attenuator 5 (see FIGURES 2 and 3) has a base 33 on which is an upright mount 34 which may be considered as having three sections. The first section 34a rises from the base 33 to somewhat over one half the overall height of the mount 34. The mount 34 is then reduced transversely in width to accommodate a lens block 34b. At the upper end of the transversely reduced portion of the mount 34 is a laterally extending arm 34c which extends somewhat beyond the lower section 34a in spaced relation to the latter.

The lower section 34a of the mount is formed with a longitudinal bore 35 in which a post 36 is slidably received. The post 36 rests on a coil spring 37 within the bore 35, the tension of the spring being adjustable by means of a set screw 38 in an enlarged continuation of the bore 35 through the base 33, the screw 38 also retaining the spring 37 in the bore 35. The upper end of the post 36 is formed with a conical seat 39 in which a ball 40 rests. Bearing against the ball 40 in axial alignment with the post 36 is the lower end of the movable spindle 41 of a vertically arranged micrometer 42 which is held securely in the arm 34c. For this purpose, the free end of the arm 34c may be slotted vertically, the slot terminating in a bore or socket in which the frame of the micrometer is seated, and the clamp being drawn tight around the micrometer frame by a screw 43. Since the spring 37 constantly urges the post 36 upwardly to maintain the ball 40 in engagement with the micrometer spindle 41, it is apparent that adjustment of the thimble 44 of the micrometer will adjust the post 36 vertically for a purpose shortly to be set forth.

The lens block 34b is provided with a bore in which are mounted one or more suitable lenses 45. Secured to the front of the lens block 34b in slightly spaced relation thereto, as by screws 46, is a second lens block 47 in which is mounted another lens 48, the lenses 45 and 48 being axially aligned. An aperture plate 49 having a substantially square aperture 50 therein is clamped in place between the lens blocks 34b and 47 by the screws 46, the aperture 50 being coaxial with the lenses 45 and 48. The light source 1 has its center of illumination on the straight line optical axis of the optical components comprising the lenses 45 and 48 and the aperture 50.

The post 36 extends through the bore 51 of a mounting block 52 for a shutter or diaphragm plate 53 which is arranged to move up and down across the aperture 50 to vary the exposure of the aperture. The block 52 is held fast to the post 36 by one or more set screws 54. The block 52 is recessed at the front to receive the diaphragm plate 53, the plate 53 being held in place on the block 52 by a clamping plate 55 and screws 56 which are threaded into the block 52. The plate 53 projects laterally into the space between the lens blocks 34b and 47 and extends over the aperture 50. As shown in FIGURE 2, the diaphragm plate 53 completely overlaps and, therefore, covers the aperture 50 so that no light can pass through the aperture. By adjusting the thimble 44 of the micrometer 42, the assembly comprising the post 36, the block 52, the clamping plate 55 and the diaphragm plate 53 can be moved vertically, as a unit, with respect to the aperture plate 49. In this manner, the aperture 50 can be varied from fully closed to fully open conditions to thereby adjust or control with precision the amount of light from the light source 1 which the aperture 50 will pass along the light path of the beam A and thus provide a scanning light beam of initial intensity for the standard material in the container 9.

The electrically operated light attenuator 17 (see FIGURES 4, 5 and 6) comprises a base block 61 to the front end of which is secured, as by screws 62, the lower, vertical portion 63a of a mounting plate 63. The plate 63 has an upwardly inclined arm 63b which extends angularly from the upper end of the lower plate portion 63a. Near its upper end, the arm 63b is formed with a bore 64 in which a lens 65 (visible in FIGURE 6) is mounted. Secured by screws 66 to the front of the arm 63b in somewhat spaced relation thereto is a lens block 67 which carries another lens 68. Clamped between the mounting plate arm 63b and the lens block 67 is an aperture plate 69 which has a tapered aperture 70 of keystone-like form. The lenses 65 and 68 and the aperture 70 are all coaxial, the center of illumination of the light source 1 being on the optical axis of these optical components.

Mounted on the rear end of the base block 61 by screws 71 is a second mounting plate 72 which carries a reversible, electric servo motor 73 of any suitable type. The shaft of the servo motor 73 is coupled by an inertia coupling 74 to the input shaft 75 of a speed reducer gear box which is secured to the rear face of the arm 63b by one or more cleats 77 and screws 78. Also secured to the rear face of the arm 63b by one or more cleats 79 and screws 80, in proximity to the gear box 76, is a potentiometer 81 which acts as an analogy transducer. The front of the plate arm 63b is formed with a pair of overlapping, stepped, circular recesses 82 and 83. The output shaft 84 of the gear box 76 extends into the recess 82, and the input end of the shaft 85 of the potentiometer 81 extends into the recess 83. A spur gear 86 in the recess 82 is locked to the gear box output shaft 84 by a screw 87, and a second spur gear 88, which is disposed in the recess 83 and meshes with the gear 86, is secured to the input end of the potentiometer shaft 85 by a screw 89.

Locked to the gear 88 by a plurality of screws 90 and a cap 91 through which the screws 90 pass is a shutter or diaphragm plate 92 in the form of a generally circular disk which extends into the space between the mounting plate arm 63 and the lens block 67 into overlapping relation with the keystone-like aperture 70. The periphery of the disk 92 is actually formed generally on a spiral but in regular, discrete, small, incremental steps 93 of gradually and uniformly increasing radii with respect to the axis of rotation of the disk from the step 93a of smallest radius to the step 93n of largest radius. Each discrete step 93 thus forms a short arc of a true circle. The length of each such arc corresponds to the distance between the taped sides of the keystone aperture 70 at which any particular step 93, spans, or is in complete overlapping relation with, the aperture 70. Twenty-one such steps 93 have been shown in the drawing by way of illustration, but it is to be understood that the disk 92 may be formed with any suitable number of such steps as may be dictated by various requirements. With this arangement, incremental variations in exposure of the aperture 70 can be obtained according to a desired or prescribed digital code.

The servo motor 73 is energized to rotate in one direction or the other in a manner presently to be set forth. As the gear 88 rotates in one direction or the other in response to coresponding rotation of the servo motor, it rotates the disk 92 to cause the disk to more or less overlap the aperture 70 and thus control, in small increments and with precision, the quantity of light that passes through that aperture from the light source 1. It is because the peripheral arcs of the steps 93 are of gradually varying length (since they are formed on different radii) that the sides of the aperture 70 are made to taper in the manner of a keystone. This arrangement of the diaphragm disk steps 93 and the aperture 70 provides truly digital, incremental variation in the amount of light from the light source 1 along the path of the beam B which is passed by the aperture 70 to provide a second scanning light beam of initial intensity for scanning the specimen in the container 21.

After the scanning beams A and B have been initially set by the attenuators 5 and 17 as described above, they are respectively transmitted through the standard material in the container 9 and the specimen under examination in the container 21. The standard material modifies the beam A to provide a reference beam of standard intensity, and the specimen modifies the beam B to impart thereto an intensity according to its transmission characteristic. It is now necessary to compare these latter two intensities to thereby obtain an output indicative of the difference, if any, between these two modified intensities. To this end, the modulator 11 is provided. This modulator is designed to modulate the intensity modified beams A and B in sinusoidal fashion and also to provide clock or reference pulses for the purpose presently to be set forth.

The modulator 11 (see FIGURES 7, 8, and 9) is in the nature of a chopper mechanism and comprises a base 101 on which is mounted an upright aperture plate 102 formed with a pair of transversely spaced, horizontally aligned, substantially V-shaped apertures 103 which diverge outwardly in opposite directions transversely of the aperture plate and also in a rearward direction. On the front side of the aperture plate 102 is mounted a lens block 104 which is of inverted, generally U-shaped form, as best seen in FIGURE 7. The lens block 104 carries a pair of lenses 105a and 105b whose optical axes are respectively coincident with the axes of the light beams A and B. To the rear of the aperture plate 102, and spaced therefrom, there is mounted a second lens block 106 which carries a pair of lenses 107a and 107b the axes of which are respectively coincident with the axes of the light beams A and B and the axes of the lenses 105a and 105b. The two lens blocks 104 and 106 are connected at the top by means of a tie plate 108 and screws 109.

Extending from the light source 1 and carried by the lens block 104 is a light transmitting rod 112 of Lucite or the like, the rod 112 extending through the block 104 and having a reduced end 112a which extends partly into an opening 113 in the aperture plate 102. At its reduced end 112a, the axis of the rod 112 is aligned with a second opto-electrical light detector 114 which is mounted in an opening 115 in the rear lens block 106 and acts as a reference photo sensor to provide electrical phase reference or clock pulses for a purpose shortly to be indicated.

Between the front lens block 104 and the rear lens block 106 is a rotatable shutter which cooperates with the aperture plate 102 to control transmission of the intensity modified light beams A and B through the apertures 103 in a manner about to be described. The shutter comprises a chopper disk 110 which is fixed to the shaft of a motor 111, also mounted on the front surface of the aperture plate 102, as by screws 116. The chopper disk 110 is formed with a plurality of circumferentially spaced, forwardly diverging, tapered apertures or openings 117 which are spaced uniformly circumferentially about the axis of the chopper disk 110. In the illustrated embodiment, the chopper disk is shown with five such circular openings which are spaced apart 72° at their centers. The openings 117 are all the same size and are spaced radially from the axis of the chopper disk a distance such that, as the chopper disk 110 is rotated by the motor 111, each of the openings 117 will be brought successively and sequentially into axial alignment, first with the aperture 103 through which the light beam A passes, and then with the aperture 103 through which the light beam B passes. Thus, each opening 117 will be swept sequentially across each of the apertures 103 from non-registering to full registering relation therewith and vice versa. However, the dimensions of the apertures 103 in the aperture plate 102 and the diameters of the openings 117, as well as the circumferential spacing of the openings 117, are such that, when one of the openings 117 is momentarily in axial alignment with one of the light beams A and B (i.e., in full registration with the cooperating aperture 103), all the other openings 117 will be displaced from the other aperture 103 and, therefore, the other light beam; and the chopper disk 110 will then momentarily completely block or stop the other light beam. As the chopper disk 110 continues to rotate and the opening 117 which is completely open to transmit a maximum quantity of light begins to leave the cooperating aperture 103 in the aperture plate 102, another one of the openings 117 begins to enter into registration with the other aperture 103 at the same instant and at the same rate. This action can best be understood with reference to FIGURES 11A to 11D.

Figure 11A:
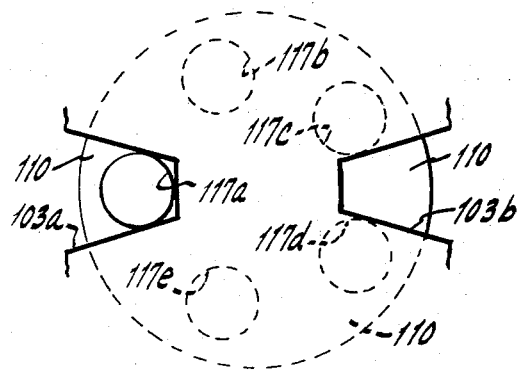

In FIGURE 11A, one of the chopper disk openings 117a is shown in complete or full registration with one of the aperture plate V-apertures 103a. Let it be assumed that the opening 117a is then in axial alignment with the light beam B. The completely open opening 117a (by reason of the complete overlapping or registration of the apertures 103a and 117a) will, at that instant, transmit the maximum amount of the light beam B. At the same instant, two other openings 117c and 117d will be so located with respect to the other V-apertures 103b that neither one has any portion thereof in registration with the aperture 103b. Thus, the light beam A will be completely blocked at that instant.

Figure 11B:
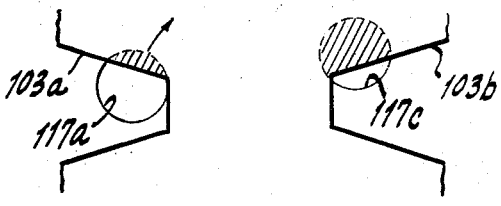
Figure 11C:
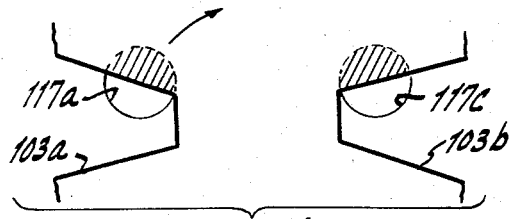
Figure 11D:
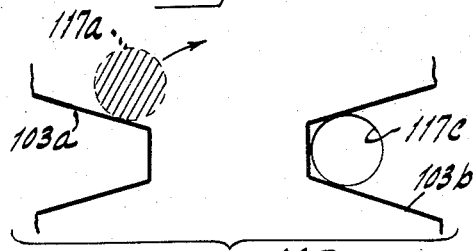

Assume, now, that the light beams A and B are of the same intensity, that the chopper disk is rotating in a clockwise direction as viewed in FIGURES 11A to 11D, and that the opening 117a has moved to a position just slightly out of registration with the V-aperture 103a, as shown in FIGURE 11B. As soon as the opening 117a begins to move out of registration with the aperture 103a, the opening 117c begins to move into registration with the aperture 103b. The portion of the opening 117a which is now out of registration with the aperture 103a is shown shaded. The portion of the opening 117c which is still out of registration with the aperture 103b is also shown shaded. Now, the shaded portion of the opening 117a is exactly equal to the unshaded portion of opening 117c. Thus, the quantity of light from the light beam A which is now being transmitted through the apertures 103b and 117c, when added to the quantity of the light beam B which is still being transmitted by the aperture 103a, will be exactly equal to the full quantity of light from either one of the light beams A and B, since, as assumed, the unmodulated beams are of the same intensity. As the shutter or chopper disk 110 advances clockwise, the openings 117a and 117c continue to sweep across the respective apertures 103a and 103b, and the overlap between the apertures 103a and 117a gradually decreases while that between the apertures 103b and 117c gradually increases. The cycle continues through the condition shown in FIGURE 11C where each pair of overlapping apertures 103a, 117a and 103b, 117c transmits exactly the same quantity of light. Eventually the opening 117a will be fully out of registration with the aperture 103a, whereupon the shutter disk 110 will block the light beam B; and at the same instant, the opening 117c will have been moved into full registration with the aperture 103b to thereby fully open the latter aperture. Since, as assumed above, both of the beams A and B have the same intensity as they approach the modulator or chopper mechanism, it will be apparent that the total quantity of light transmitted by the modulator will be constant, and that the electro-optical detector or balance sensor 3, which receives and responds additively to both of the now modulated light beams A and B, will provide a constant output, or D.C. signal in the assumed case.

Figure 12A:
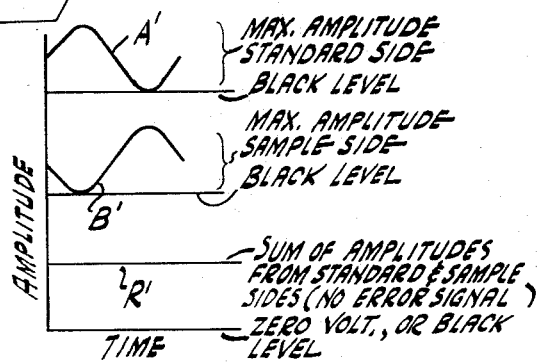

Because the openings 117a—117e are all circular and of the same diameter, and the apertures 103a and 103b have the same taper and are of the same transverse dimension, and because the openings 117a—117e all sweep across the apertures 103a and 103b at precisely the same rate, the chopper disk 110 will chop or modulate the two light beams in sinusoidal fashion. Also, since one aperture 103 in the plate 102 is fully open when the other one is fully closed, and vice versa, it is apparent that the two beams will be sinusoidally modulated in 180° phase displaced relation. The foregoing is represented by the curves of FIGURE 12A wherein the uppermost curve A' indicates the sinusoidally modulated beam A, the intermediate curve B' indicates the sinusoidally modulated beam B 180° phase displaced from the curve A, and the lowermost, straight line curve R' indicates the resultant D.C. output of the sensor 3 in response to the curves A' and B'.

Let it be assumed, now, that the intensity of the light beam B, as modified and transmitted to the modulator 11 by the sample of material in the container 21, is of smaller amplitude than that of the light beam A, as modified and transmitted by the standard material in the container 9. This condition is indicated by the amplitude by the curves A" and B", respectively, in FIGURE 12B. In this case, when the balance sensor 3 compares the modulated light beams by adding them, it will provide a sinusoidal electrical signal output represented by the resultant curve R". If the curve A" is positive in the first phase and negative in the second, the resultant curve R" will similarly be positive in the first phase and negative in the second phase, and vice versa. In any case, the resultant curve R" will be indicative of the difference in intensities between the beams A and B and the sense of this difference.

Let it now be assumed that the beam B, after modification and transmission by the specimen in the container 21, is of greater intensity than that modified and transmitted by the standard material in the container 9. This condition is represented by the amplitude curves A''' and B''' of FIGURE 12C. In such case, the resultant curve R''' (again assuming the curve A''' to be positive and the curve B''' to be negative in the first phase) will be negative in the first phase; and if the phases of the curves A''' and B''' are reversed, then, of course, that of the curve R''' will also be reversed.

It now remains to determine the sense of the output signal from the sensor 3, as represented by the curves R" and R'''. This output signal may first be fed to a band pass amplifier 121 which limits its own output to a narrow band in the neighborhood of, say, 100 c.p.s. The output of the amplifier 121 is then fed to a combined detector and amplifier 122 which is designed to pass signals above a predetermined, small, threshold amplitude. Thus, if the difference in densities between the scanning beams A and B, as modified, respectively, by the standard and the specimen materials, is within a tolerable limit, so that the amplitude of the sensor 3 output signal R" or R''', as the case may be, is also within the tolerable limit, the signal fed to the detector 122 will not be passed by that detector. However, if the difference in the light beam densities exceeds the tolerable limit, then the signal fed to the detector 122 wil be accepted and amplified by it.

To detect the sense of the electrical balance output signals R" and R''' of the sensor 3, use is made of the light beam C which, as will be recalled, is transmitted from the light source 1 to the phase reference photo sensor 114 by the light transmitting rod 112. As can be seen best in FIGURES 7 and 8 the rod 112 is positioned to direct the beam C to the sensor 114 through the path prescribed by the openings 117 as the chopper disk 110 rotates. Hence, the disk 110 chops the beam C synchronously with the chopping by it of the scanning beams A and B to provide light pulses from the reference beam C which strike the sensor 114. These light pulses are converted by the sensor 114 into electrical phase reference pulses which are amplified by an amplifier 123. The amplified electrical output pulses of the amplifier 123 are applied to the detector 122 synchronously with the sinusoidal electrical balance signal outputs represented by the curves R" and R'''. The amplified electrical phase reference pulses supplied to the detector 122 by the amplifier 123 are employed by the detector 122 for comparison with, or to examine, a given or selected phase of the sinusoidal electrical balance signals supplied synchronously thereto by the amplifier 121. In this way, the sense of the balance signal is determined.

The amplified output signals of the detector-amplifier 122 are utilized to operate the servo motor 73 and also to operate one or the other of a pair of relays 124 and 125, depending on the sense of the sensor 3 output balance signals R" or R''' in a given phase. The servo motor 73 will be rotated in one direction or the other as described above to correspondingly rotate the shutter plate 92. Rotation of the shutter plate 92 will change, in digital fashion, the initial density of the beam B transmitted by the attenuator 17 and thus re-establish the balance in the balance photo sensor 3. The servo motor 73 will also rotate the potentiometer transducer 81 correspondingly. The potentiometer 81 provides an analog output which may be used to operate a suitable recording instrument, for example, such as an analog voltage recorder (not shown) for providing an indication of the involved, actual spectral characteristic of the specimen or sample under examination, as well as any variations in such characteristic, or for any other suitable purpose.

Figure 12B:
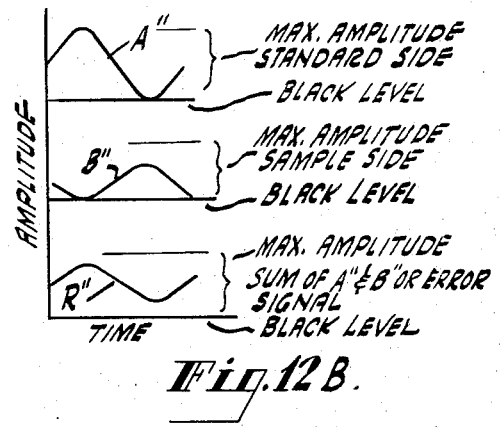
Figure 12C:
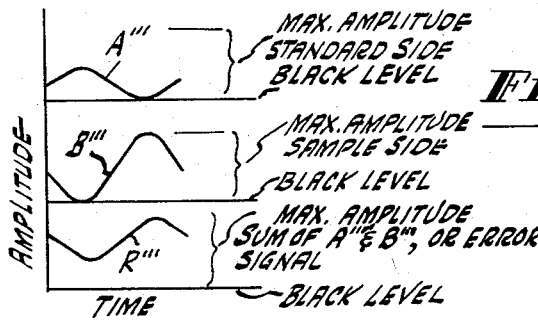

If the two scanning beams A and B have the same density after transmission, respectively, by the standard and the specimen materials, as represented in FIGURE 12A, or if their respective densities differ only slightly and within tolerable limits, then the servo motor 73 will not be operated. In turn, neither the shutter plate 92 nor the potentiometer 81 will be actuated. Similarly, under the same conditions, neither one of the relays 124 or 125 will be energized, since there will be no output from the detector-amplifier 122. On the other hand, if the density of the modulated scanning beam A is greater than that of the modulated scanning beam B, as represented in FIGURE 12B, the servo motor 73 will be rotated in one direction and one of the relays (for example the relay 124), will be energized, while the other relay 125 remains de-energized. Similarly, if the modulated scanning beam B has the greater density, as represented in FIGURE 12C, then the servo motor 73 will be rotated in the opposite direction, and the relay 125 will be energized while the relay 124 will remain de-energized. The outputs of the relays 124 and 125 may be employed to also operate suitable recording instruments for indicating the differences, if any, between the densities of the scanning beams A and B after transmission thereof by the standard and the specimen materials, respectively, or to operate control devices, such as switches for turning on and off all or parts of apparatus to which the colorimeter is connected, valves for controlling the composition of the specimen material under examination to bring it to the desired density value, etc.

The system shown in FIGURE 10 is essentially similar in arrangement and operation to that shown in FIGURE 1. However, whereas the system of FIGURE 1 is designed to deal with the transmisison characteristic of the material under examination, that of FIGURE 10 is designed particularly to deal with the reflection characteristic of a material. Thus, in place of the container 9, there is provided, in the path of the scanning beam A, a holder 131 for a standard, light reflecting material 132 which reflects the beam A. To direct the beam A from the integrator cell or light diffuser 13 onto the standard material 132, a mirror 133 is provided. A similar mirror 134 directs the beam A, after reflection from the standard 132, through the lenses 105a and 107a. A specimen material to be examined (not shown) is disposed in the light path B similarly to the standard material 132 and in a corresponding holder therefor. The specimen material may be one the color or the light reflective characteristic of which it is desired to evaluate and/or monitor. Such specimen material may comprise a plate similar to the standard plate 132, or it may comprise an elongated strip, such as a tape, which is fed continuously through its holder.

From the foregoing description, it will be apparent that there has been provided an improved colorimeter system which will determine accurately, and with precision, various spectral characteristics of various materials. Such a system readily lends itself to use on a production line and will not only cause to be recorded information indicative of the actual spectral characteristics of interest, but which can also be made to operate automatically to institute corrective steps immediately upon detection of an intolerable departure of the characteristic of the substance under examination from accepted standards. As indicated above, this can be accomplished, for example, through the relays 124 and 125. When the system is initially set up for operation, the manual attenuator 5 is adjusted to make the scanning beam A match in intensity that of the scanning beam B. Thereafter, the beam A is used as a reference standard, and subsequent changes in intensity of the beam B will be compensated automatically by means of the electrical attenuator 17.

Although only two forms of the invention have been described herein, it will undoubtedly be apparent to those skilled in the art that other forms thereof, as well as certain modifications in the various optical and other components of the system, all coming within the spirit of the present invention, are possible. It is desired, therefore, that the foregoing shall be taken merely as illustrative and not in a limiting sense.

I claim:

In a system for monitoring a spectral characteristic of a material, the combination of (a) means providing a plurality of light paths and including a light source common to all of said paths for providing a scanning light beam of the same initial intensity along two of said paths and a phase reference providing light beams along a third of said paths, (b) means in a first of said pair of light paths for presenting to the scanning light beam therein a standard material adapted to modify the intensity of the scanning beam in said first path and thus provide a first, intensity reference beam of standard intensity, (c) means in the second of said pair of light paths for presenting to the scanning light beam therein a specimen of said material for modifying the intensity of the scanning beam in said second path to thereby provide a second beam having the intensity imparted thereto by said specimen, (d) an adjustable light attenuator means for controlling the initial intensity of said light beam in said second of said pair of light paths, (e) chopper means common to all three of said light paths for effecting modulation of said first and second intensity modified beams in sine wave fashion but in 180° phase displaced relation, and for effecting modulation of said phase reference providing light beam to provide phase reference light pulses, said chopper means comprising an aperture plate having a plurality of discrete apertures, each for a separate one of said three light beams, and a rotatable chopper disk associated with said aperture plate and itself having a plurality of spaced apertures therein in position to successively intercept said aperture plate apertures sequentially as said chopper disk rotates to provide said modulations, (f) first opto-electrical light sensor means common to said first and second light paths and responsive to both of said first and second modulated light beams for comparing the intensities of said first and second modulated light beams and providing an alternating electrical balance signal output indicative of the difference, if any, between the intensities of said first and second modulation modified beams, (g) second opto-electrical light sensor means responsive to said light pulses for converting said phase reference light pulses into electrical phase reference pulses, (h) detector means coupled to said first and second opto-electrical light sensor means and responsive concurrently to said electrical balance signal and to said electrical phase reference pulses for determining the sense of said balance signal in a given phase thereof and providing an output signal corresponding to the sense of said balance signal, (i) a reversible motor coupled to said detector means and responsive to said last named output signal for rotation in one direction or the other according to the sense of said last named output signal, said motor being coupled to said light attenuator for correspondingly adjusting said attenuator, and (j) means coupled to said attenuator to indicate the amount of light attenuation in said second of said pair of light paths.

References Cited by the Examiner

UNITED STATES PATENTS

| | | | |
|---|---|---|---|
| 1,746,525 | 2/1930 | Darrah. | |
| 1,919,182 | 7/1933 | Fitzgerald. | |
| 2,032,128 | 2/1936 | Horsfield | 88—14 |
| 2,133,562 | 10/1938 | O'Brien | 88—14 |
| 2,166,947 | 7/1939 | Fayerweather | 88—61 |
| 2,251,613 | 8/1941 | Kott | 88—14 |
| 2,282,198 | 5/1942 | Murcek. | |
| 2,287,322 | 6/1942 | Nelson | 88—14 |
| 2,442,910 | 6/1948 | Thomson | 88—14 |
| 2,528,924 | 11/1950 | Vassy | 88—14 |
| 2,547,212 | 4/1951 | Jamison et al. | 88—14 X |
| 2,583,132 | 1/1952 | Altar et al. | |
| 2,589,421 | 3/1952 | Morrison | 88—61 |
| 2,601,182 | 6/1952 | Tyler | 88—14 X |

(Other references on following page)

UNITED STATES PATENTS

| | | |
|---|---|---|
| 2,678,725 | 5/1954 | Jacobson. |
| 2,686,452 | 8/1954 | Bentley _____ 88—14 |
| 2,750,834 | 6/1956 | Golay _____ 88—14 |
| 2,774,276 | 12/1956 | Glasser et al. _____ 88—14 |
| 2,834,247 | 5/1958 | Pickels _____ 88—14 |
| 2,843,008 | 7/1958 | Moutet _____ 88—14 X |
| 3,013,466 | 12/1961 | Kaye _____ 250—232 X |
| 3,031,077 | 4/1962 | Mumma et al. _____ 88—14 X |
| 3,131,349 | 4/1964 | Cary et al. _____ 88—14 X |

FOREIGN PATENTS

| | | |
|---|---|---|
| 689,856 | 4/1953 | Great Britain. |
| 817,829 | 8/1959 | Great Britain. |
| 354,964 | 7/1961 | Switzerland. |

OTHER REFERENCES

Alfriend, "Light Sensitive Process Control" (received U.S. Patent Office September 1933).

JEWELL H. PEDERSEN, *Primary Examiner.*

T. L. HUDSON, O. B. CHEW, *Assistant Examiners.*